Figure 1:
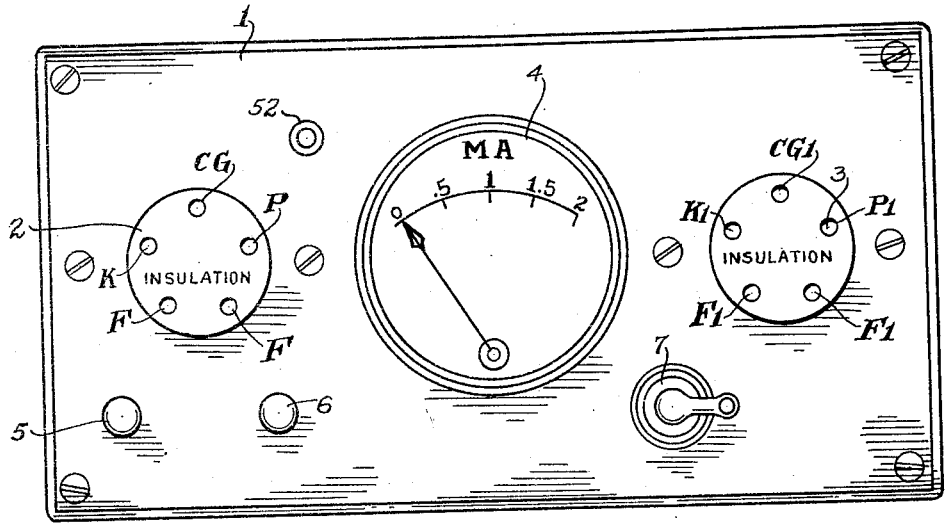

Feb. 7, 1933.　　　D. TAYLOR　　　1,896,726

RADIO TUBE COMPARATOR

Filed June 9, 1931

Inventor

Dale Taylor

By Mason Fenwick Lawrence
Attorneys

Patented Feb. 7, 1933

1,896,726

UNITED STATES PATENT OFFICE

DALE TAYLOR, OF ELMIRA, NEW YORK

RADIO TUBE COMPARATOR

Application filed June 9, 1931. Serial No. 543,186.

The invention forming the subject matter of this application is an instrument for comparing the tubes of a set with a perfect tube as standard under actual broadcast reception and in the location and circuits in which the tested tubes have to operate.

There are various known methods of testing radio tubes. Heretofore, all radio experts believed that there was actually only one known satisfactory method to test the efficiency of a tube. This method consists in substituting a tube known to be absolutely perfect for the tube to be tested during actual reception at low volume, and then noting the difference in performance by actual ear test.

The radio service man, when called to service a radio in the set owner's home, finds in almost every instance, defective tubes to be the underlying cause of poor or no reception. However, the service man frequently finds that the set owner has just brought back his tubes from a radio store where they had been tested and were pronounced to be in good condition. No doubt they probably did test all right on the tester in the radio store. They were not paralyzed or burnt out, and that is just about all the average counter tube tester will show. It means practically nothing to the average set owner when the service man or dealer tells him that he needs a new tube because a certain tube in the radio shows only a difference of four instead of six milliamperes when the grid difference switch of the tester is pressed. The set owner is primarily interested in the question of whether new tubes will give better results and greater signal strength and clearer reception than the old tubes. He may be quite dubious that just one tube being weak could completely spoil reception. On the other hand, if the set owner could be shown by actual side-by-side comparison between the tubes of the set and a perfect standard tube, by switching immediately from the standard tube to the one under test he could determine aurally any actual difference between the operation of the two tubes during broadcast reception.

With the '26 type of tube formerly used in the earlier all electric radio sets, it was comparatively easy for the radio service man or dealer to determine, by substituting a new tube in place of a weak one, just how much a new tube would or would not improve reception of the set. This type of tube heated up to its full operating efficiency in approximately two seconds. Thus it was an easy matter to distinguish an improvement in volume and tone quality almost immediately. At present radio set manufacturers have practically all adopted the so-called heater type of tube as a detector, oscillator, radio, intermediate, and audio frequency amplifier; and, it takes approximately from seven to forty-five seconds for these types of tubes to heat up to their full operating efficiency.

Up to the present time it has been practically impossible to compare the heater type tubes by the substitution method. A device known as a preheater is built by different manufacturers. This device, as the name implies, is designed to heat up the heater type tubes to their operating efficiency in separate sockets first. Then they have to be substituted one by one in place of the old tubes in the radio under test by the comparison method. Theoretically the idea is good, but practically the disadvantages of this method are numerous. For instance, while taking the tube from the preheater and then substituting it into a socket in the radio set, it is very difficult to make a change quick enough to denote any increase in signal strength before the tube starts to cool off, causing a drop in volume. The time required to make this change varies from 4 to 7 seconds in the ordinary type radio. In the midget or compact type of radio, it takes more time to substitute a tube taken from the preheater and locate its prongs in the proper socket contacts than in the ordinary set. In the majority of these compact sets, a metal shield must first be removed from around the tube to be tested and then replaced around the other tube substituted from the preheater. It takes time to change these shields, but the shields, in most sets, are necessary to prevent the set oscillating. Due to the compactness of these midget sets, the time lapse in changing tubes in this type of radio is much greater than in the larger sets.

The main object of the present invention is to provide the radio art with a method of testing the tubes of a set under actual reception by comparison with perfect standard tubes.

Another object of the invention is to provide an instrument by which anyone of ordinary skill in the art can determine both aurally and visually, by actual comparison with standard perfect tubes, the condition of the tubes in a radio set during actual broadcast operation.

Other objects of the invention will become apparent as the detailed description thereof proceeds.

Figure 2:
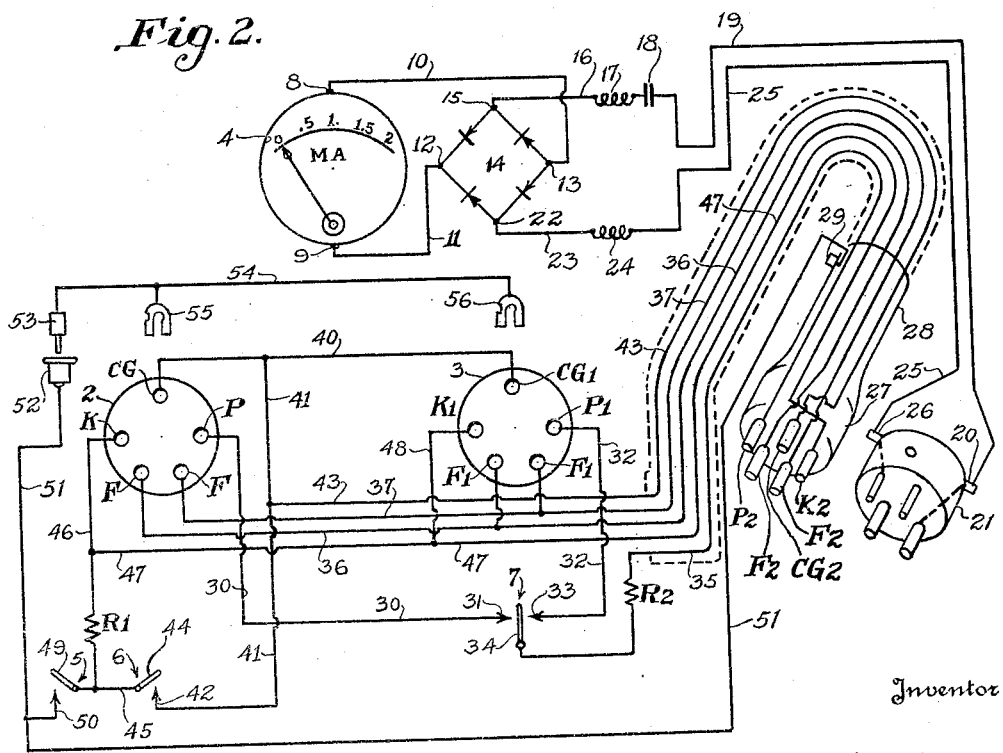

In the drawing:

Figure 1 is a top plan view of the instrument designed to practice this invention; and Figure 2 is a diagrammatic layout illustrating the connections between the several parts of the instrument and their mode of operation.

The instrument comprises a panel 1, of any suitable insulating material, having two UY-type tube socket members 2 and 3 arranged thereon, preferably on opposite sides of a rim type output meter 4. On the panel 1 there is also suitably mounted two oscillation suppressor switches 5 and 6, a comparator switch, 7, and a jack 52. It is to be understood, of course, that this panel 1 merely forms an upper panel in a casing which encloses the wiring connected to switches and meter mounted on the board, and that any suitable cover may be hinged or otherwise secured to the casing to protect this panel.

Referring now to the layout of Figure 2, the meter 4 is shown as having its terminals 8 and 9 connected by wires 10 and 11 to terminals 12 and 13, respectively, to a copper oxide rectifier unit 14. One terminal 15 of the unit 14 is connected by a wire 16, through a choke coil 17 and a blocking condenser 18, in series, to a wire 19 connected to the terminal 20 of the output meter audio adapter 21, shown herein as an UX-four prong-plug. The other terminal 22 of the unit 14 is connected by a wire 23, through the choke coil 24 and wire 25, to the other terminal 26 of the adapter 21.

The adapter 21 is designed to connect the output meter 4 to the output of the receiver set to be tested. It is used by removing one of the power tubes of the set, inserting the adapter 21 in the socket of the removed tube, and then placing the removed tube in the socket of the inserted adapter. If the last audio stage of the set is not of the push-pull type, the adapter 21 will be placed in the socket of the last audio tube, and this tube placed in the inserted adapter. The meter 4 will then indicate visually any increase in the signal strength recorded audibly by the speaker of the set.

The socket members 2 and 3, of the five prong UY-type are connected to a five prong (UY) plug 27, having a handle 28 extending therefrom and provided with a laterally projecting contact 29. The socket 2 is intended to receive the tube to be tested, and the socket 3 is intended to receive a perfect tube of the same type as the tube under test in socket 2. The plate socket P of the member 2 is connected by a wire 30 to one contact 31 of the comparator switch 7; and the plate socket P1 of the member 3 is connected electrically by a wire 32 to the other contact 33 of the comparator switch 7.

The contacts 31 and 33 are spaced apart from each other; and a switch bar 34 is positioned normally out of contact with both of said contacts but adapted to be moved into connection with either of the said contacts. The bar 34 is connected at its pivoted end by a wire 35, having a resistance R2 interposed therein, to the plate prong P2 of the plug 27. The filament sockets F of the socket member 2 are connected by wires 36 and 37 to the filament prongs F2 of the plug 27; and wires 38 and 39 connect the filament sockets of member 3 to the wires 36 and 37, respectively.

The sockets CG and CG1 of the members 2 and 3 are connected to each other by wire 40, which, in turn is connected to a wire 41 leading to a contact terminal 42 of the single pole oscillation suppressor switch 6. A wire 43 connects the wire 41 to the prong CG2 of the plug 27; and a pivoted switch plate 44 connected at its pivot end to wire 45 is suitably mounted to be moved into and out of contact with the terminal 42.

The wire 45 is connected to the cathode socket K through a resistance R1 and a wire 46; a wire 47 connects the wire 46 to the cathode prong K2 of the plug 27, a tap 48 connecting the cathode socket K1 of member 3 to the wire 47. The other end of wire 45 has the switch rod 49 connected thereto to move into and out of contact with the terminal 50 which is connected to the wire 51 having one end connected to the jack socket 52 and its other end detachably connected to the control grid contact 29 on the handle 28.

The jack plug 53 is connected by a wire 54 to the spring contact clips 55 and 56, adapted to be detachably connected to the control grid contacts of any screen grid tubes being compared.

The five wires 35, 36, 37, 43, and 47 are preferably enclosed in a suitable flexible loom or casing; but the wire 51 must be kept separate from these five wires, because of its high degree of sensitivity, and the loss of signal strength which would result from absorption by the other circuits if all wires were enclosed in the same casing in close proximity to each other.

The control grid clips 55 and 56 are intended to be clipped onto the control grid contacts of the screen grid tubes inserted in the comparator sockets when this type of tube is being compared and tested.

The resistance R1 is a 10,000 ohm fixed resistance connecting, through the switches 44 and 49, the control grid contacts CG and CG1 in the sockets 2 and 3, and the clips 55 and 56 for use on screen grid tubes, with the cathode leads 46 and 47—48 of the comparator tube sockets. The purpose of this resistance is to effectively reduce, by a slight grounding effect of the control grids through this resistance to the cathodes, the input signal strength from the receiver impressed on the grids of each tube in the comparator. By lowering the sensitivity of these tubes, the resistance effectively prevents the tube from oscillating when the comparator is plugged into the sockets of different stages of radio and intermediate frequency amplifiers of certain types of radio receiving circuits.

When switch 49 is closed the resistance R1 is in the line between the cathodes of the comparator tubes and the control grid clips 55 and 56 for the screen grid type of tubes. When the switch 44 is closed the cathodes of the two tubes are connected through the resistance R1 and wires 40 and 41 to the control grid contact sockets when the '27 type of tubes are under comparison.

The resistance R2 of about 200 ohms, offers a resistance in the place circuit of the comparator to reduce the normal plate voltage ordinarily applied to the plate of the tube when operated in its proper location in the radio receiver. By slightly reducing the plate voltage of each tube being compared individually in the sockets 2 and 3 of the comparator, that particular tube is made less sensitive. Therefore, the tendency of the tube to oscillate, caused by the close coupling and feed back effect due to the length and proximity of the lead wires of the cable, is further reduced.

The top contact CG, CG1 of these sockets serve two different purposes. That is, when the comparator is plugged into a screen grid circuit, this top contact is the screen grid contact to the tube in the comparator socket; but when the plug is used in a circuit where the '27 type of tube is employed, this contact becomes the control grid contact for that tube. When the screen grid tubes are being compared 55 and 56 become the control grid contacts for each tube.

In the drawing the meter 4 is shown as an 0—2 D. C. milliammeter of the conventional type and of any preferred design. The fixed condenser 18 is of .02 mfd. capacity, and is connected from one terminal of the milliammeter MA, through the copper oxide rectifier unit 14 to one of the leads coming from the power tube adapter 21. This condenser acts as a blocking condenser to keep the high plate voltage, which is encountered when the adapter 21 is placed in the output circuit of an audio amplifier, from directly passing through the windings of the milliammeter, thus causing the meter to burn out or be otherwise damaged.

The two small choke coils 17 and 24 offer an effective impedance to the A. C. component current present in the audio frequency of the last stage amplifier to which the adapter 21 may be connected.

What I claim is:

1. A radio tube comparator comprising a meter, means for operably connecting the meter to the output of a radio set, a pair of tube receiving sockets, means for connecting said pair of sockets to any of the tube sockets of the said set, and means for alternatively connecting the plate elements of each of the said pair of sockets to said meter.

2. The method of comparing the tubes of a radio set with standard tubes which consists in heating the standard tube and a similar tube of the set simultaneously by energy derived from the set, and alternatively determining the signal strength of said tubes when heated.

3. The method of comparing the tubes of a radio set with standard tubes which consists in heating the standard tube and a similar tube of the set simultaneously by energy derived from the set, and alternatively determining the strength of plate current in each tube when both tubes are heated.

4. A radio tube comparator comprising a support having a pair of similar vacuum tube sockets mounted thereon, a meter mounted on said support, an adapter for connecting the meter to the output of a radio set, a contact plug adapted to engage the contacts of a vacuum tube socket of said set, means for electrically connecting the contacts of said plug to the contact elements of the pair of sockets mounted on said support, and means for alternatively connecting through said plug and electrical connecting means, the plate contacts of each of said pair of sockets to said meter.

5. In a radio tube comparator, a plug having plate, filament and cathode contacts adapted to engage the socket contacts of a vacuum tube socket of a radio set, a pair of vacuum tube sockets, conductors connecting the plug contacts to the socket contacts of each of said pair of sockets, a meter, means for connecting the meter to the output of said radio set, and a switch for alternatively connecting through said plug and one of said conductors the plate contacts of each of said pair of sockets to said meter.

6. In a radio tube comparator, a casing having a pair of vacuum tube sockets, an electrical indicating instrument and a single pole double throw switch mounted thereon; a contact plug adapted to engage the contacts of a vacuum tube socket of a radio set, leads connecting said plug to the contacts of each of said pair of sockets, means for connecting said meter to the output of said set, said switch being operable alternatively to connect through said plug and one of said leads the plate elements of each of said pair of sockets to said meter.

7. The combination set forth in claim 1 of means for preventing oscillation of said receiver by the addition thereto of any inductance and capacity forming part of the comparator.

In testimony whereof I affix my signature.

DALE TAYLOR.